No. 636,155. Patented Oct. 31, 1899.
F. N. MACKAY.
DEVICE FOR COUPLING BICYCLES.
(Application filed May 21, 1898.)

(No Model.) 7 Sheets—Sheet 1.

Witnesses.
Dennis Sumby.
Robert Everett.

Inventor.
Frederick N. Mackay.
By James L. Norris.
Atty.

No. 636,155. Patented Oct. 31, 1899.
F. N. MACKAY.
DEVICE FOR COUPLING BICYCLES.
(Application filed May 21, 1898.)

(No Model.) 7 Sheets—Sheet 2.

Fig.2.

Witnesses.
Dennis Sumby.
Robert Everett.

Inventor.
Frederick N. Mackay.
By James L. Norris
Att'y.

No. 636,155. Patented Oct. 31, 1899.
F. N. MACKAY.
DEVICE FOR COUPLING BICYCLES.
(Application filed May 21, 1898.)

(No Model.) 7 Sheets—Sheet 3.

Witnesses.
Dennis Sumby.
Robert Everett.

Inventor.
Frederick N. Mackay.
By James L. Norris
Atty.

No. 636,155. Patented Oct. 31, 1899.
F. N. MACKAY.
DEVICE FOR COUPLING BICYCLES.
(Application filed May 21, 1898.)

(No Model.) 7 Sheets—Sheet 4.

Fig. 5.

Witnesses
Dennis Sumby.
Robert Everett.

Inventor
Frederick N. Mackay.
By James L. Norris.
Atty.

No. 636,155. Patented Oct. 31, 1899.
F. N. MACKAY.
DEVICE FOR COUPLING BICYCLES.
(Application filed May 21, 1898.)
(No Model.) 7 Sheets—Sheet 5.

No. 636,155. Patented Oct. 31, 1899.
F. N. MACKAY.
DEVICE FOR COUPLING BICYCLES.
(Application filed May 21, 1898.)
(No Model.) 7 Sheets—Sheet 6.

Witnesses,
Dennis Sumby,
Robert Everett.

Inventor
Frederick N. Mackay,
By James L. Norris.
Att'y.

No. 636,155. Patented Oct. 31, 1899.
F. N. MACKAY.
DEVICE FOR COUPLING BICYCLES.
(Application filed May 21, 1898.)
(No Model.) 7 Sheets—Sheet 7.

Witnesses,
Dennis Sumby.
Robert Covitt.

Inventor
Frederick N. Mackay.
By James L. Norris.
Atty.

UNITED STATES PATENT OFFICE.

FREDERICK NOEL MACKAY, OF WILLESDEN, ENGLAND.

DEVICE FOR COUPLING BICYCLES.

SPECIFICATION forming part of Letters Patent No. 636,155, dated October 31, 1899.

Application filed May 21, 1898. Serial No. 681,346. (No model.)

*To all whom it may concern:*

Be it known that I, FREDERICK NOEL MACKAY, engineer, a subject of the Queen of Great Britain, residing at 4 Nicoll road, Willesden, England, have invented certain new and useful Improvements in and Connected with Devices for Coupling Bicycles, of which the following is a specification.

This invention relates to means for connecting two bicycles together side by side, such means being more particularly, although not exclusively, applicable to rear-driving safety-bicycles.

The chief object of my invention is to provide suitable connecting devices that may be readily and conveniently carried upon a bicycle, which devices, together with the duplicate devices carried by another bicycle, will enable the two bicycles to be coupled and ridden together even if they be of different types or sizes, such connecting devices being resilient and permitting most or all of the driving power to be applied on one of the bicycles only, while the combined machine will run steadily and accommodate itself to the inequalities of the road-surface.

According to my invention I make the principal connection between the bicycles in the form of a spring or springs. I also provide connecting bars or rods adapted to be hooked or otherwise secured to the framing of the bicycles. I prefer to so construct these bars that they shall be slightly resilient or shall have a certain amount of "play" in the sockets by which they are attached to the framing, so that while maintaining the separation and parallelism of the two bicycles they will permit one bicycle to slightly advance or recede relatively to the other, the amount of such advance being governed by the aforesaid spring connection. By this means also the two bicycles are enabled to swing or become inclined when traveling on curves in the same manner as a single bicycle. The attaching devices both of the springs and of the connecting-bars are so contrived that said springs and bars can be readily sprung into place and retained therein without the use of bolts or nuts.

In order that my invention may be clearly understood and readily carried into effect, I will proceed to describe the same more fully with reference to the accompanying drawings, in which—

Figs. 9 and 10 are respectively a side and an end elevation of the socket attached to the rear fork end of the bicycle for receiving the extremity of the spring device and of a connecting bar or rod.

Figure 1:
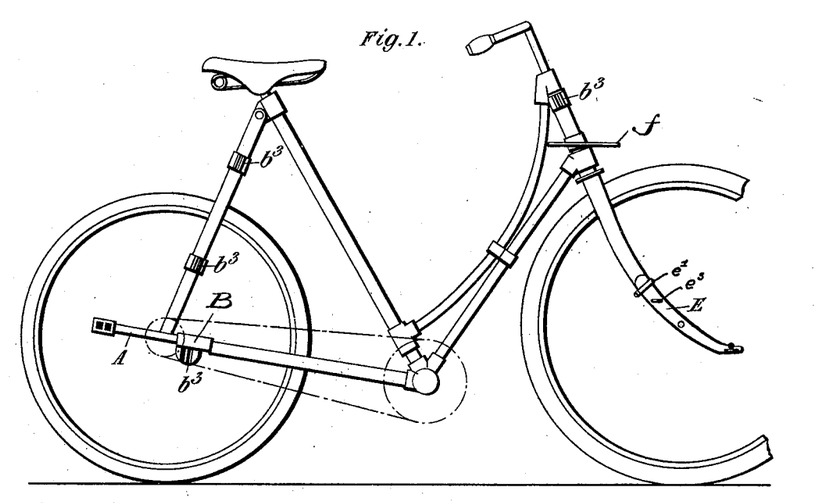
Figure 1 is a side elevation of a lady's bicycle having my improved coupling devices attached thereto.
Figure 2:
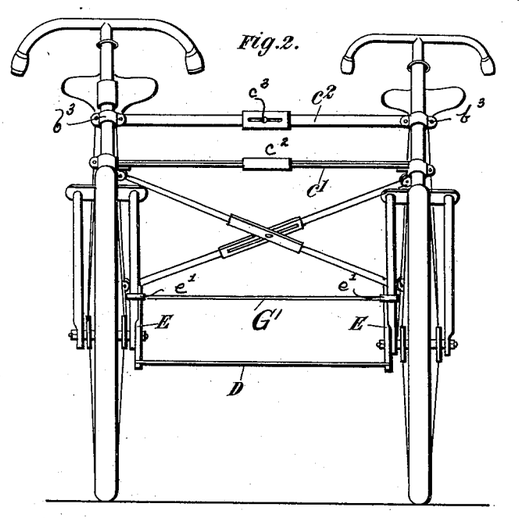
Fig. 2 is an end view, and Fig. 3 a plan, of two bicycles coupled together by means of these devices.
Figure 3:
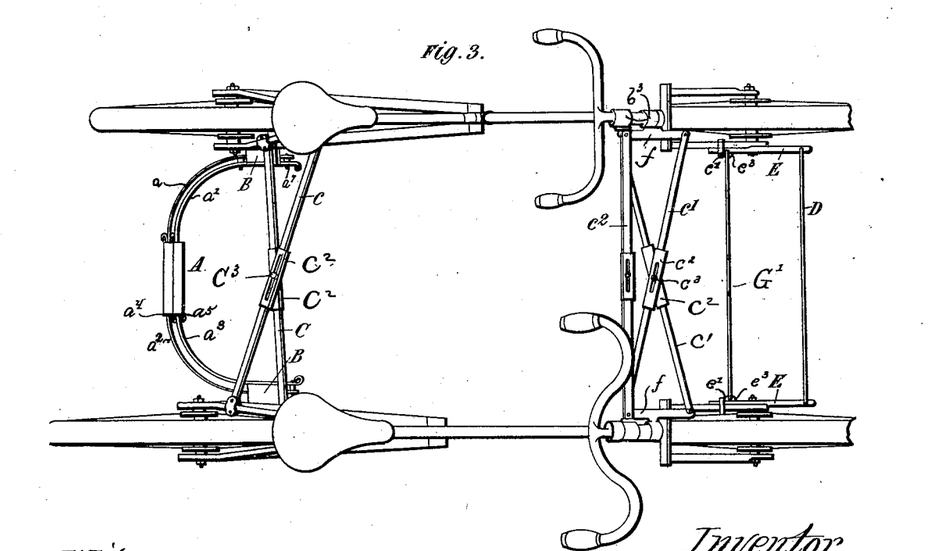

Referring first more particularly to the arrangement shown in Figs. 1 to 3, A is a spring forming the principal connection and attached at its extremities to sockets B B on each bicycle. $c$ $c$ are the rear and $c'$ $c^2$ $c^3$ the forward connecting bars or rods. D is a bar for connecting the front wheels and insuring that they are deflected simultaneously and equally. This bar is articulated to arms E E, secured to and forming extensions of the adjacent front forks of the machines. This articulation is such that the bar can move in all directions to the extent required, the construction of the joint being shown in Figs. 14 and 14$^a$.

I employ any suitable spring composed of a flat steel strip or strips or a coiled spring capable of being bent into the form of a semicircle and having flat ends adapted to fit into retaining-sockets. I prefer, however, to use either of the devices shown in Figs. 1 to 6.

Figure 7:
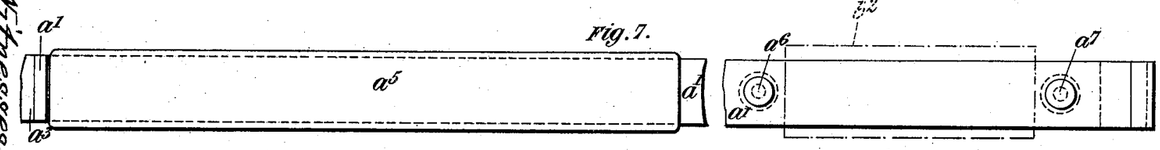
Figs. 7 and 8 are respectively a fragmentary elevation and a plan of one form of the spring device, also showing the means for securing the ends of the said device in the sockets on the bicycles.
Figure 8:
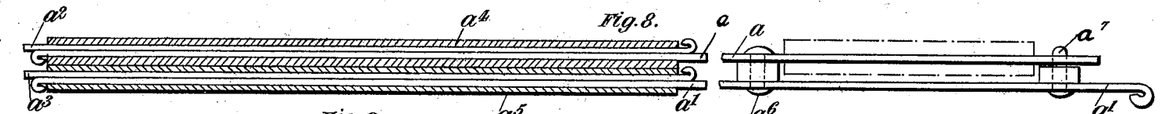

The spring device shown in Figs. 1 to 3 and more particularly illustrated in Figs. 7 and 8 comprises four strips of spring-steel $a$ $a'$ $a^2$ $a^3$. The adjacent ends of each pair of strips $a$ $a^2$ and $a'$ $a^3$ overlap and are inclosed by a sleeve $a^4$ $a^5$, the extremities of the strips being curled or bent to prevent their slipping out of said sleeves. When not in use, the length of this spring device may be reduced for convenience of carrying by sliding two strips, as $a$ $a'$, through the sleeves. The two strips at each end of the spring are connected together at a short distance from their extremities by a rivet $a^6$. The end of each of the strips $a$ $a^2$, is formed with a hole into which fits a pin $a^7$, secured to the other strip $a'$ or $a^3$. The ends of the spring A are secured in the sockets B by separating the ends of the two strips, so that the pin $a^7$ is withdrawn from the hole, and then passing the end in which said hole is formed through the sleeve $b^2$ in the socket B, hereinafter described, after which the end carrying the pin is allowed to spring back into its normal position, and thus hold the device in position as shown in Fig. 3.

I may dispense with the sleeves $a^4$ $a^5$ and employ pins or rivets for connecting the adjacent ends of the steel strips comprising the spring in a pivotal or detachable manner.

Figure 4:
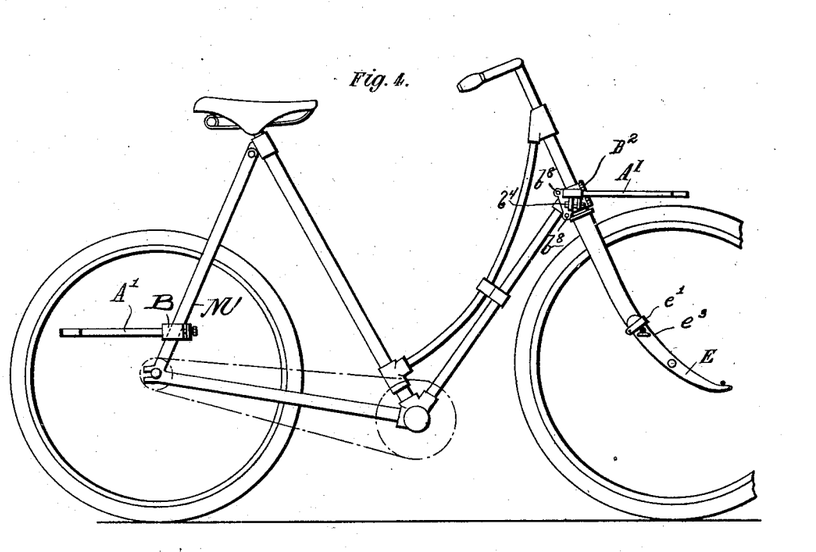
Figs. 4, 5, and 6 are views similar to Figs. 1, 2, and 3, showing a modified arrangement of my coupling devices.
Figure 5:
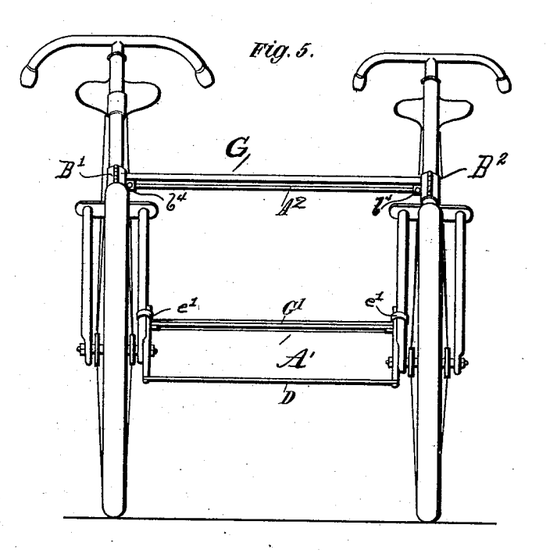
Figure 6:
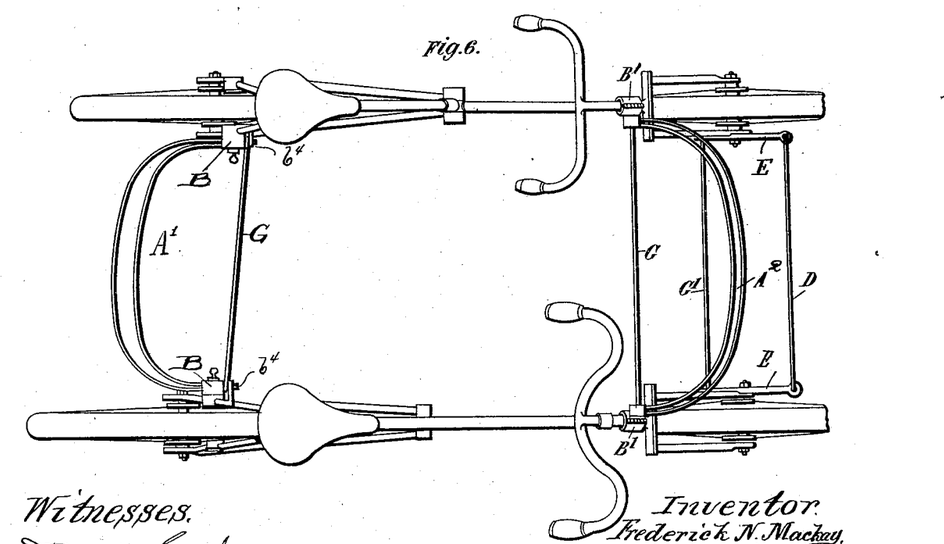

In Figs. 4 to 6 I have shown spring devices consisting of single strips of steel. The extremities of each strip preferably fit into the socket B and are firmly held thereby in a manner preventing their twisting therein, as hereinafter described.

Obviously instead of arranging the springs in pairs I may employ only single springs or sets of three or more springs.

My reason for employing flat springs is that such springs when curved or bent possess a strong tendency to maintain their ends in a plane vertical to their width—that is to say, if they are distorted into a partly-helical form they will tend to reassume a partly-circular form. Consequently, the flat ends of said springs being firmly held in sockets on the bicycles, when such bicycles are inclined to one side or the other the springs insure their return to an upright position.

The brackets or sockets B, arranged upon the bicycles to which the ends of the spring A are secured, may be of any suitable construction and be formed of metal, vulcanite, or other material, it being necessary that the spring should be firmly held with its width in a plane parallel to the vertical plane of the bicycle and that means be provided by which the operator is enabled to readily attach or detach the springs to or from the said sockets.

Figures 9, 11C:
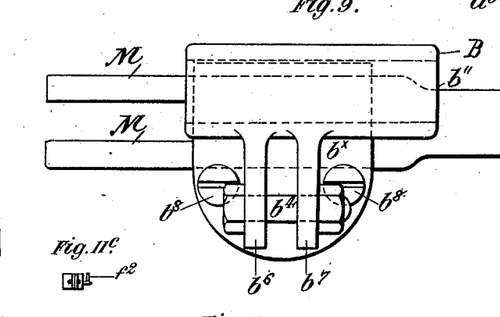
Figure 10:
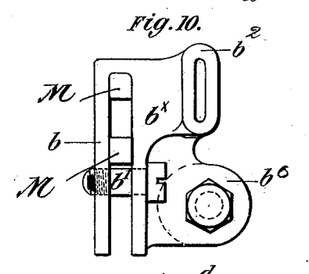

In Figs. 9 and 10 I have illustrated an appropriate form of socket for fitting to the back fork end M of a bicycle, such fork end consisting of a flat strip of steel brazed at one end to the lower fork member or stay and slotted at the other end to receive the rear wheel-bearing spindle, as is well understood. $b^2$ is the sleeve or socket proper, adapted to receive the end of the spring, as hereinbefore described. The body or frame $b^×$ of the socket has a flap $b$, between which and the body the forked end M is clamped by the screw-studs $b'$. In the figures referred to the body is provided below the sleeve with a pair of lugs $b^3$ $b^3$, supporting a bolt $b^4$, to which a connecting-bar may be attached, as hereinafter explained. This socket is also shown in Figs. 1 to 3, the lugs $b^3$ and bolt $b^4$ not being required, however, in this instance.

Figures 14, 15, 16, 17, 18:
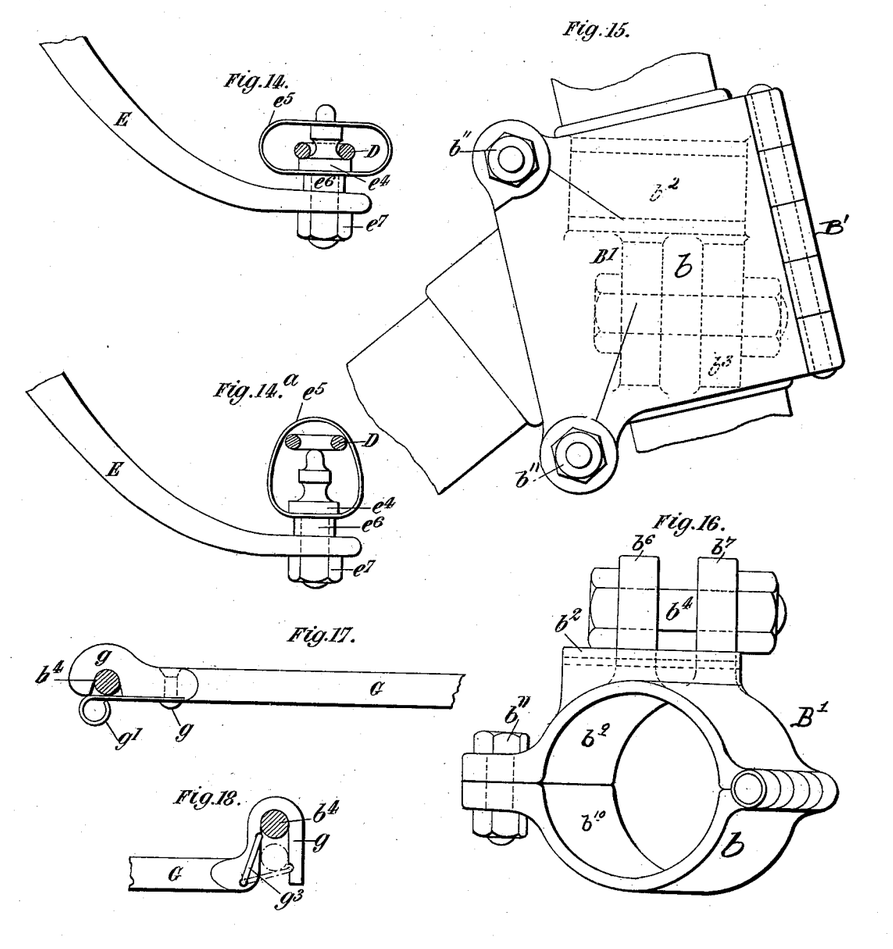
Figs. 14 and $14^a$ illustrate a device for connecting the steering connecting-rod to the said arm.
Figs. 15 and 16 are respectively a side elevation and a plan of a socket similar to that shown in Figs. 9 and 10 employed on the head of the machines as shown in Figs. 5 and 6.
Figs. 17 and 18 show two constructions of connecting-rod end.

The sockets that are to be arranged upon tubular parts of the framing, of which an appropriate form is shown in Figs. 15 and 16, are similar in construction in respect of the sleeve $b^2$ and the lugs $b^3$; but the flap $b$ is necessarily hinged to the body $b^×$. I may also employ bolts $b''$ instead of the studs $b'$ for tightening the clamp formed by said flap and the body portion of the socket.

Figure 11:
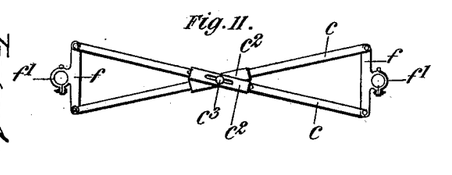
Fig. 11 is a detail plan view of the pair of connecting-bars I employ for connecting the bicycles as shown in Figs. 2 and 3. This view also shows the socket or means for attaching the same to the heads of the bicycles. Figs. $11^a$ and $11^b$ are respectively a plan and an elevation of one portion or half of a connecting-bar. Fig. $11^c$ is an end elevation of the socket, and Fig. $11^d$ is a separate view of the hook thereon, over which the extremities of the connecting-bar may fit, as shown by dotted lines.
Figures 11A, 11B:
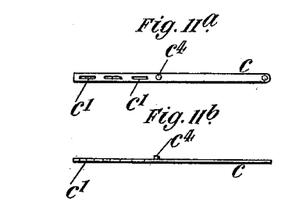
Figure 11D:
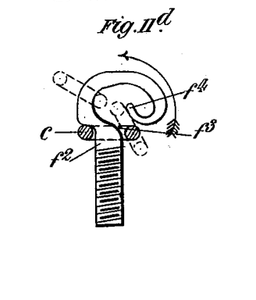

The arrangement of the pair of crossed connecting-bars C and C' is shown in Figs. 11, 11$^a$, and 11$^b$. Each member or bar consists of two overlapping strips of metal $c$ $c$, provided with slots $c'$ and surrounded by a slotted sleeve $c^2$ at their overlapping portions. A single bolt $c^3$, passing through both sleeves and the four strips, is employed to securely retain them in position after they have been adjusted to suit the relative sizes of the bicycles which it is desired to couple together. This bolt grips the sleeves tightly; but the strips are sufficiently loose in the sleeves to slide over one another, the extent of their movement being of course governed by the length of the slot through which the bolt passes. I thus provide for the lengthening of one and the shortening of the other bar, which is requisite, for instance, in the connecting-bars C when the bicycles become inclined, as in steering around a corner, or in the bars C' when one bicycle is in advance of the other. I may provide a spring tending to maintain the bolt $c^3$ in a central position in the slots of the strips through which it passes; but I have found that the spring device A is sufficient for this purpose, especially where two such spring devices are employed. In some cases, however, it may be preferred to use the members parallel instead of crossed, and for this purpose I provide a pin or stud $c^4$ on each strip, adapted to engage with a slot of the opposite strip. In this case the sleeve may be dispensed with. One such bar C$^2$ is shown in Figs. 1 to 3. These connecting bars or rods are adapted to be hooked or otherwise secured in sockets permanently fixed on the framing of the bicycles. Figs. 11 and 11ᶜ illustrate a form of socket suitable for connecting them to the head. It consists of a straight piece $f$, capable of being secured to the head by the clip $f'$. At the extremities of the piece $f$ are arranged hooks $f^2$, (see Fig. 11$^d$,) onto which the pieces $c$ are adapted to be hooked by means of holes or eyes provided at their ends. In Fig. 11$^d$ the dotted lines indicate two positions which the eye formed at the end of the strip $c$ occupies during the operation of placing it upon this hook. After said strips are fixed together they cannot become displaced from said hook. In some cases the point $f^4$ of the hook may be made in the form of a spring bearing against the shoulder $f^3$, so as to form an additional security against displacement of the connecting-bars.

Figures 12, 13:
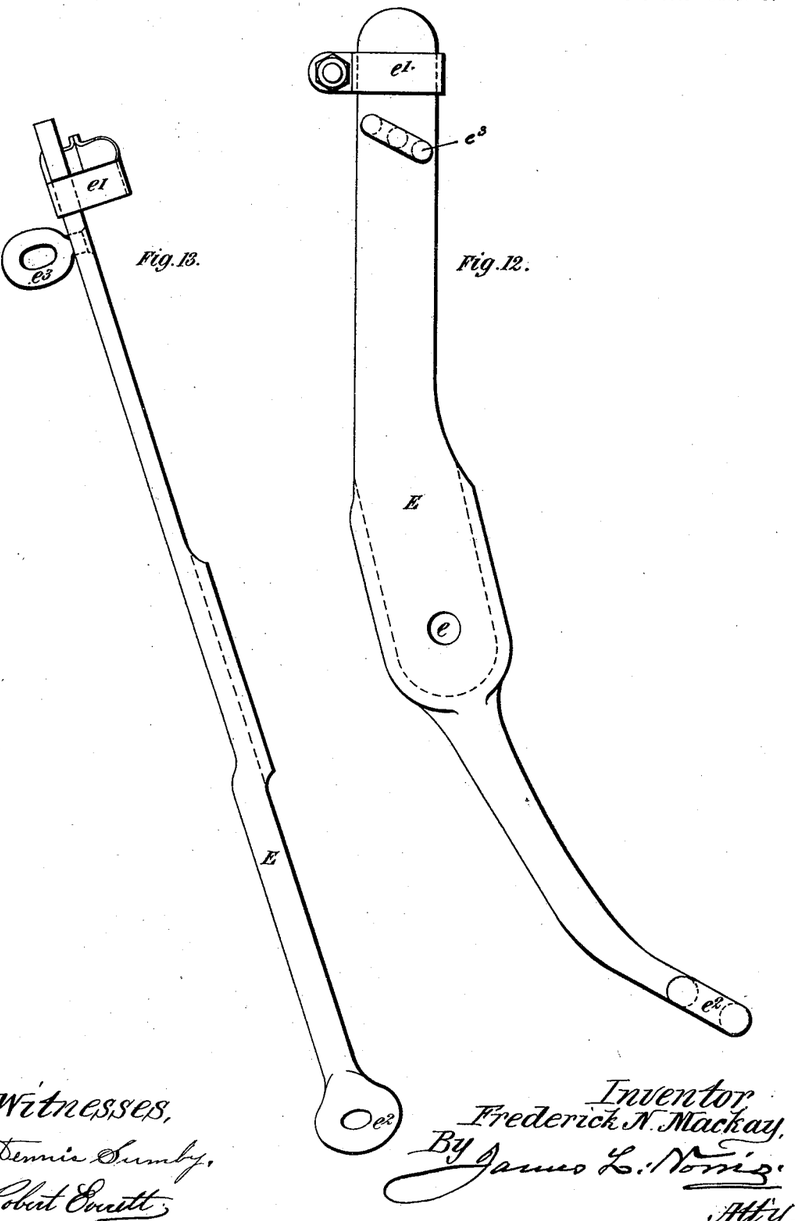
Figs. 12 and 13 are respectively a side and an end elevation of the arm or lug secured to the front fork of the bicycle and carrying the rod for connecting the steering-wheels.

The arm E, adapted to be fixed to one of the front forks and to carry the steering connecting-bar D, is shown in Figs. 12 and 13. The upper half of this arm is formed to fit over the fork end, and a hole $e$ is provided in the arm, through which passes the spindle of the wheel. The nut on this spindle is tightened up outside the arm, and thus serves to retain it in place. An additional attachment may be provided in the form of a clip $e'$, embracing the fork and the upper extremity of the arm. Beyond the fork end the arm is extended downwardly and forwardly and terminates in an eye $e^2$, to which may be hooked the connecting-bar D. The arrangement I prefer, however, to employ is illustrated in Figs. 14 and 14$^a$, and consists of a pin $e^4$, having a suitable shoulder, on which rests an eye that is formed at the end of the bar D. A ring or band $e^5$ of spring-steel is fixed to this pin, being secured between the shoulder and a washer $e^6$. The normal shape of this spring is that shown in Fig. 14, whereby it prevents any displacement of the bar D. When, however, it is desired to connect or disconnect the said bar, the sides of the spring are compressed between the fingers and thumb, so as to cause said spring to assume the shape shown in Fig. 14$^a$, and thus permit the eye to be passed over the top of the pin $e^4$. The nut $e^7$ serves to secure both the pin $e^4$ on the arm E and also the spring $e^5$ on the pin.

Referring now to Figs. 4 to 6, according to the construction shown in these figures I employ two spring connecting devices A' A², comprising single strips of steel, as already described. The second spring device A² is secured to the lower parts of the heads of the bicycles and is adapted to curve forwardly, so as to be out of the way of the rider's knees. The socket B', to which the extremities of this second or front spring are attached, is illustrated in Figs. 15 and 16 and has already been mentioned. It will be seen that the clamp formed by the hinged flap $b$ and the body $b^\times$ embraces the head-tube and also the main tube of the bicycle-frame, one of the bolts $b''$ being placed on each side of the latter. This arrangement prevents the socket from slipping either up or down on the head. The ends of the spring may be secured in the sleeve $b^2$ in any of the manners already described. The rear spring A' is shown as secured in sockets B, attached to the upper back forks instead of to the stays or fork ends.

It may be desired to couple a bicycle up with another sometimes on the right side and sometimes on the left, and in order to render this possible without entirely removing the sockets B and reattaching them upon the opposite side of the bicycle I have designed a socket comprising two main portions, one of which is permanently secured to the frame of the bicycle and the other of which comprises the sleeves or sockets for the spring and the attachment for the connecting-bar and is capable of being temporarily secured to the first portion in any convenient manner. The first portion is duplicated, one of said portions being fixed in the proper position on each side of the machine, so that the second portion of the socket may be attached to either of the first portions, according to which side it is desired to arrange the bicycle.

In this construction of coupling device instead of arranging some of the connecting bars or rods to cross each other I arrange them all parallel. These parallel connecting-bars G are constructed with ends adapted to hook over the bolts $b^4$ between the lugs $b^6$ and $b^7$ of the sockets B B', Figs. 9, 10, 15, and 16, or over the bolts $b^4$, Figs. 4 and 6. Fig. 17 shows the form of connecting-bar end I prefer to use. The extremity of the bar is bent into hook shape at $g$, and the mouth or opening of the hook is closed by the spring $g'$, secured to the bar at G. This arrangement permits the ready attachment or disconnection of the bar to or from the bolts $b^4$ (or $b^9$) without the use of bolts, thumb-screws, or other separate devices that are liable to be lost, while the spring obviates any liability of the said bars being displaced while riding. Instead of employing a spring $g'$ I may employ a loop of wire $g^3$, as shown in Fig. 18. This loop is pivoted to the connecting-rod at a point adjacent to the shoulder of the hook portion $g$ and is adapted, when said hook is passed over the bolt, to be turned so that its free extremity lies in a recess provided for the purpose. As soon as the hook is in position the loop $g^3$ falls into the position shown in dotted lines, and thus prevents said hook becoming accidentally detached from the bolt. I arrange one of these connecting-bars at the rear of the frame, attached to the socket B, and another at the front of the frame, attached to the socket B' at the bottom of the head.

If desired, I may employ an additional connecting-bar attached to sockets arranged at the upper part of the head. These sockets may be similar to the sockets B', but without the sleeves for receiving the extremities of the spring devices.

The arrangement of the steering connecting-bar D and arms E is the same as in the previously-described construction.

I sometimes find it advantageous to employ an additional connecting-bar at the front of the machines, such as a bar G'. (Shown in Figs. 4 to 6.) Eyes $e^3$ are provided at the upper end of the arm E for the attachment of this bar G'.

By means of my invention two bicycles may be coupled in such a manner that the combined machine will run with the same or greater ease than a single bicycle and will incline to one or the other side in traveling in curved paths in the same manner as a single bicycle and that either bicycle will ride over obstacles without raising the other, there being a constant tendency by reason of the twist given to the flat spring or springs (whose ends are rigidly held in the sockets parallel to the vertical plane of the bicycles) for the two bicycles to be returned to their upright and level position, as has been previously explained. Moreover, my invention provides an efficient coupling means by which one bicycle only may be the driving one, the other bicycle and its rider being propelled thereby through the resilient action of the springs, the strength or resilience of which is so arranged as only to permit a slight "lag" to the non-driver. In fact one of the coupled bicycles may be arranged and utilized entirely as a carrier, and in this form my invention is especially useful for postal and military purposes, any driving-bicycle being capable of being quickly coupled to or uncoupled from any non-driver or carrier. My invention is also extremely useful for teaching bicycle-riding.

Although I have described my invention as employed for connecting together two bicycles, it is obvious that it may be applied by the use of an extra set of coupling devices to connect three or even more bicycles side by side. When tandem bicycles are coupled together, I may employ one or more additional springs and connecting-rods.

What I claim is—

1. In a coupling for connecting two bicycles, the combination with brackets upon the framing of the bicycles and sockets upon said brackets, of resilient devices comprising leaf-springs extending from bracket to bracket and bent so that their extremities lie parallel with the plane of the bicycles said extremities being detachably secured to sockets upon said brackets, substantially as described.

2. In a coupling for connecting two bicycles, the combination with brackets clamped upon the framing of the bicycles of resilient connecting devices comprising leaf-springs extending from bracket to bracket and adapted to be bent so that their extremities lie parallel with the planes of the bicycles, sleeves upon said brackets into which the said extremities can be passed and means for detachably securing them therein, and connecting-bars flexibly connected to said brackets for holding the springs in their bent or curved form while preserving the separation and parallelism of the bicycles and permitting one of them to advance or be raised relatively to the other, substantially as described.

3. In a coupling for connecting two bicycles, the combination with brackets clamped upon the frame of said bicycles, each bracket being provided with a suitable socket, of connecting devices comprising four leaf-springs, the first and third forming one pair and the second and fourth a second pair, one spring in each pair having its outer end passed through the socket in one of said brackets, its extremity which projects beyond the bracket being coupled to the end of the second spring in that pair, the latter spring being outside of and close to the bracket, and two independent sleeves arranged between the bicycles, the inner end of one spring in each pair lying movably in each sleeve, the extremities of said spring projecting beyond said sleeves and being bent to prevent withdrawal, substantially as described.

4. In a coupling for connecting two bicycles, the combination with two brackets one of which is clamped upon the fork of each bicycle, of a group of leaf-springs the alternate springs being arranged in pairs the outer end of one spring in each pair being connected to one of said brackets and coupled to the outer end of the second spring in that pair, two sleeves arranged between the bicycles each sleeve inclosing and permitting longitudinal movement of the springs in each pair of springs the inner ends of the latter extending beyond said sleeves and being bent to prevent withdrawal from said sleeves, extensible connecting-bars having their ends flexibly jointed to the frames of the two bicycles, said bars being crossed between the latter and slotted at the point of intersection, and a single pin lying in both slots and connecting while allowing longitudinal movement of said bars, substantially as described.

5. In a coupling for connecting two bicycles, the combination with brackets clamped upon the forks of the cycle-frame, of two connecting-rods each composed of two members, their outer ends flexibly jointed on the brackets, two slotted sleeves each inclosing the inner ends of the two members forming one of said rods, the sleeves being slotted, and a single bolt passing through the slots in both and through slots in the four members forming the two connecting-rods, substantially as described.

In testimony whereof I have hereunto set my hand, in presence of two subscribing witnesses, this 10th day of May, 1898.

FREDK. NOEL MACKAY.

Witnesses:
F. W. McLELLAN,
FRED C. HARRIS.